Oct. 30, 1956 — H. R. SEELEN ET AL — 2,768,475
METHOD OF MAKING GLASS-TO-METAL SEAL
Filed Nov. 28, 1952 — 2 Sheets-Sheet 1

INVENTOR.
HARRY R. SEELEN AND
WILLARD E. ANTHONY
BY William A. Paluck
ATTORNEY

Oct. 30, 1956 H. R. SEELEN ET AL 2,768,475
METHOD OF MAKING GLASS-TO-METAL SEAL
Filed Nov. 28, 1952 2 Sheets-Sheet 2
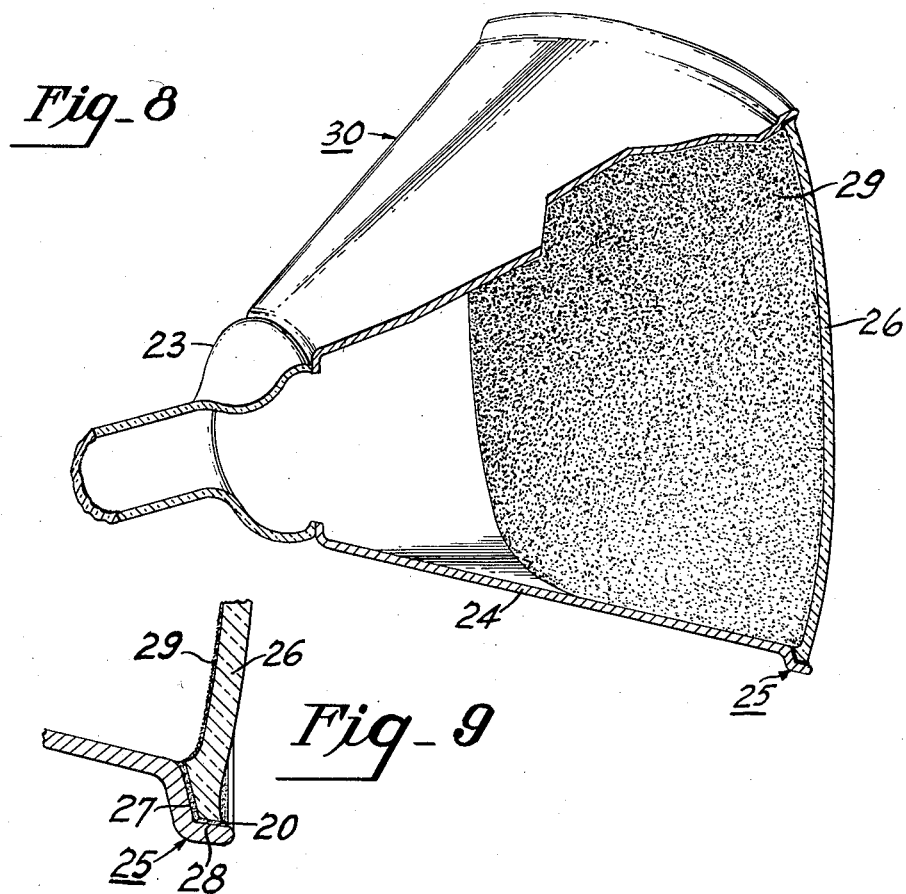
INVENTOR.
HARRY R. SEELEN AND
WILLARD E. ANTHONY
BY William A. Zaluzak
ATTORNEY United States Patent Office 2,768,475
Patented Oct. 30, 1956

2,768,475

METHOD OF MAKING GLASS-TO-METAL SEAL

Harry R. Seelen and Willard E. Anthony, Lancaster, Pa., assignors to Radio Corporation of America, a corporation of Delaware Application November 28, 1952, Serial No. 323,018

8 Claims. (Cl. 49—81)

The present invention relates to improvements in the art of making an hermetic seal between a metallic frame member and one or more glass sheet-like members.

It has long been sought to make a satisfactory multiple glazed insulation unit wherein at least two panes of glass are held spaced from each other and bonded together in an air-tight manner. In view of the cost of such units and the high cost of the constructions into which they are more or less permanently installed, such units, to be satisfactory, must have a relatively long useful life.

Multiple glazed insulation units heretofore have been unsatisfactory primarily because of failure of the air tight bond between the panes, inability to withstand physical and thermal shock, and for other reasons. One type of such unit is constructed with a spacer between two adjacent surfaces of glass panes and near their outer edges with a plastic material covering the edge of the assembly to prevent the entrance of air and moisture. According to another construction two adjacent glass surfaces each have a ribbon-like metallic deposit near the outer edge thereof, to which is soft-soldered a metallic spacer. In still another type of unit one pane is sealed to the other by means of a glass-to-glass fusion seal. According to yet another type of construction a U-shaped metal alloy spacer of the same coefficient of expansion as the glass is hermetically sealed to each pane along the opposing edge portions thereof with or without an intermediate frit. A frit may be comprised of powdered glass particles mixed with a suitable binding agent. Frits are usually used as a basis for certain glazes.

Of necessity such units are large and involve large seals in view of the purpose for which they are intended, units having an area of one square foot or somewhat less being the smallest that are practical while considerably larger units are particularly desirable. Though the units manufactured heretofore employing glass-to-metal sealing techniques have proven to be the most satisfactory available, such units have been extremely costly and have relatively short life. Though it is now possible to make glass-to-metal seals of relatively small area in a high speed manner and even larger seals where the components are circular or cylindric, the size and rectangular shape of multiple glazed units as well as the requirement that the glass elements must be substantially free from distortion have to date made their manufacture extremely difficult and costly without providing a satisfactory product.

A principal object of the present invention is to provide an improved method for bonding a glass member to a metal member.

Another object of the present invention is to provide an improved method for bonding a glass member to a metal frame member by means of a compression type hermetic seal.

An object of the present invention is to provide an improved method of making a glass-to-metal hermetic seal having a long seal path and involving large surface glass members sealed to frame members of large peripheral dimensions.

Still another object of the present invention is to provide a method of making a glazed window unit which is permanently bonded to a framing member in an air tight manner and which has high resistance to thermal and physical shock.

A still further object of the present invention is the provision of a method for making window construction units wherein a metallic frame member is symmetrically sealed to a glass member in two or more planes to provide a long seal path.

The above and related objects are achieved in accordance with the present invention by sealing a continuous frame member to the periphery of a glass member by means of an improved intermediate frit sealing technique.

Frit type seals, as such, are old in the art of glass-to-metal seals. Under the prior art practices, frits served as wetting agents to facilitate proper sealing of the glass to the metal member, and also served to pre-glaze the cleaned and oxidized metallic sealing surfaces of the metal member in order that the frame need not be sealed directly to the glass member.

In accordance with the present invention, after the pre-glazing of the metal, additional frit is applied to the frame member so that, when the glass member is sealed to the frame, the additional frit fills in gaps between the glass member and the frame, making a continuous seal therebetween. Because the frame is shrunk onto the glass, a compression type hermetic seal results. Units so constructed, that is, with a continuous frame and using compression type glass-to-metal seals made in accordance with the present invention, can withstand greater physical and thermal shock than prior art multiple glazed units. Also, if the frit used in making the seal has a lower melting point than the glass, the seal may be made with little or no distortion of the glass member, since the glass need not be heated to its softening point in order for the sintered or molten frit to bond thereto.

Referring now to the accompanying drawings, in which corresponding reference numerals refer to corresponding parts in the several figures:

Fig. 8 is a perspective view, partly in section, of a kinescope which embodies a glass-to-metal seal made in accordance with the present invention; and Fig. 9 is a fragmentary view, on an enlarged scale, of the glass-to-metal seal illustrated in Fig. 8.

Figure 1:
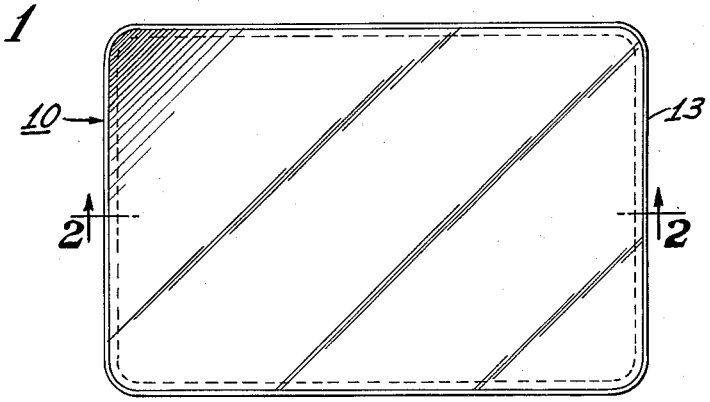
Fig. 1 is a plan view of a multiple glazed window unit made in accordance with the present invention.

Referring to Fig. 1, a multiple glazed unit 10 has two sheet elements or panes of glass 11, 12 aligned substantially in parallel relation and hermetically sealed to an endless frame member 13. Though unit 10 is shown and described as having two sheet glass elements it is obvious that the number of elements may be varied as desired without departing from the scope of the present invention. The present invention may be applied to the sealing of a kinescope face plate to the "frame" surface of the kinescope's metal cone, as shown in Figs. 8 and 9.

Figure 2:
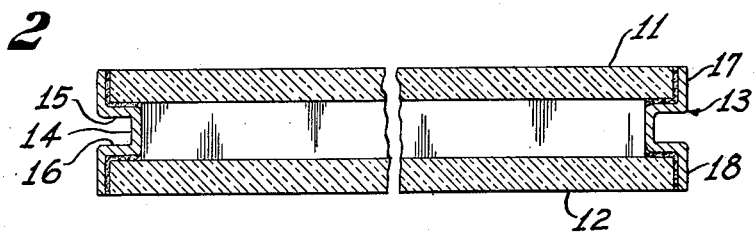
Fig. 2 is an enlarged sectional view thereof along line 2—2 of Fig. 1.

Referring to Fig. 2, metallic frame member 13 preferably has flexible spacing web 14, lands 15, 16 and wings 17, 18. In order to provide a longer seal path, glass element 11 is hermetically sealed not only to land 15 but also to wing 17. Glass element 12 is similarly sealed.

Although the present invention will be described in connection with a frame member having a cross sectional configuration as shown in Fig. 2, it is obvious that frames of different cross sectional configuration may be used in accordance with the teaching of the present invention, and several such frames are illustrated and described in Harry R. Seelen's co-pending application U. S. Serial No. 129,957, filed November 29, 1949, and entitled Multiple Glazed Unit (now U. S. Patent 2,708,774).

Figure 3:
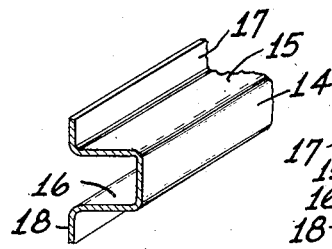
Figs. 3–7 illustrate the steps of making the seal of the window unit of Fig. 1.

Referring to the steps of making glass-to-metal seals in accordance with the present invention, Fig. 3 shows the flexible metal frame 13 after the sealing wings 17, 18 and lands 15, 16 have been cleaned and oxidized prior to the pre-glazing operation. The cleaning is preferably done by sand blasting the sealing surfaces 15, 16, 17, 18 following which the sealing surfaces are oxidized either by chemical means, such as a sodium dichromate or potassium dichromate bath, or by heating the frame 13 in a slightly oxidizing atmosphere.

Figure 4:
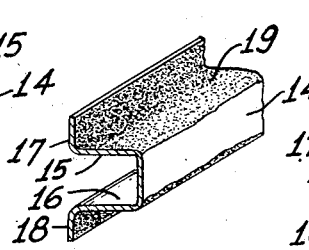

In Fig. 4, the frame 13 is shown after the frit 19, which is in suspension, has been applied by spraying for example, and the frame 13 heated to liquify the frit 19 and pre-glaze the sealing surfaces 15, 16, 17, 18 with a glaze which is 6 to 10 mils thick. Frit 19 may, for example, be composed of about 70% PbO, 15% $B_2O_3$ and 15% $SiO_2$.

Thus far the sealing technique used is in accordance with the teaching of the prior art. If the multiple glazed units were being made according to prior art practices, the glass panes 11, 12 would then be inserted in the frame 13 and the unit 10 heated until the panes 10, 11 and frame 13 were bonded together. However, commercial production of window units made in such a manner would be difficult for several reasons. First, in order that the frame 13 be flexible enough to allow for differential thermal expansion between panes of glass 11, 12 without excessive strain on the glass, the frame 13 must be made of relatively thin material which would be subject to bending and distortion under materials handling conditions present in normal factory operation.

Secondly, commercial glass panes which are available in large quantities are usually not precisely uniform in size, nor are they free from imperfections such as small chips or checks along their edges. These edge imperfections would undoubtedly be multiplied when the corners of the glass panes were rounded in order that they conform to the contour of the frame 13. Since it is highly desirable that the frame 13 and glass 11, 12 be bonded together by a compression type glass-to-metal seal in order to produce a unit that can withstand more physical or thermal shock without breaking, it is necessary that the frame 13 and the glass 11, 12 be sealed together along their entire peripheral surface if the compressional forces are to be maintained within reasonable tolerances and if an hermetic seal is to be obtained.

Under the conditions outlined above, it is highly improbable, if not impossible, that factory production of these units could be made at a cost that would be competitive to prior art window units of the type now commercially available.

Another difficulty arises in connection with units made in the above described manner. In order that the glass panes 11, 12 be sealed to the pre-glazed frame 13 it would be necessary that the glass be heated to its softening point, which would result in at least some distortion of or non-parallelism between the glass panes. Such distortion would particularly occur in the case of large area window units, where the mass of the glass is great. Even a small non-parallelism between the panes produces objectionable diffraction lines under certain lighting conditions.

Figure 5:
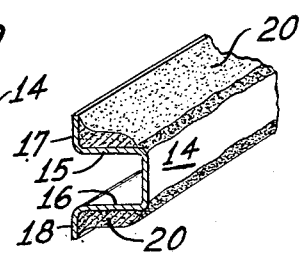

The step illustrated in Fig. 5, in which additional low melting point frit putty 20 is applied to the sealing surfaces 14, 15, 16, 17 of the pre-glazed frame 13, not only permits mass production of acceptable window units even though the frame and glass do not "fit" perfectly around their peripheral edges, but also results in units which can withstand more physical shock than units in which the frame and glass were directly sealed to each other in a compression type seal of the type mentioned previously in connection with Figs. 3 and 4. The improved shock resisting properties will be discussed in detail later.

Figures 6, 7:
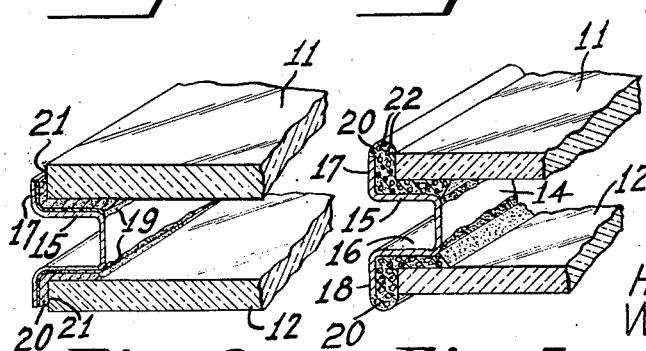

Following the application of the frit putty 20, which is a frit having a high degree of viscosity so that it may be applied with a putty knife or spatula, as illustrated in Fig. 5, the panes 11, 12 are assembled with the frame 13 as indicated in Fig. 6, although the spacing between frame and glass as shown in Fig. 6 has been exaggerated. The units are then heated so that the wing portions 17, 18 of the metal frame 13 expand away from the panes 11, 12. The additional frit putty 20 is sintered when the frame 13 is heated, but the frit 20 is not completely liquified, and the individual glass particles retain their identities. During the sealing operation the additional frit putty 20, in addition to its normal function of bonding the glass panes 11, 12 to the pre-glazed frame 13 at a temperature below the softening point of the glass panes 11, 12, acts as a lubricating medium so that on return to room temperature after the bonding has taken place, the frit 20 adjusts itself readily to the configuration of the glass panes 11, 12 and the metal frame 13. Upon return toward room temperature and until such time that it freezes or solidifies (the setting point), the additional frit 20 is progressively squeezed until it fills the interstices extending between the frame 13 and the glass panes 11, 12.

Fig. 7 is an enlarged cross-sectional view of the completed seal. The additional frit putty 20 fills the spaces or interstices between the glass 11, 12 and both the land 15, 16 and wing 17, 18 sealing surfaces, any excess of the frit 20 being squeezed out.

The additional frit 20 has a milky appearance, whereas the frit 19 used to pre-glaze the frame 13 sealing surfaces, being completely liquified, has the appearance of clear glass. The additional frit 20, being only sintered, owes its milky appearance to the many air bubbles which occur in its cellular-like formation. The air bubbles occur as a result of the sintering of the frit putty 20. The individual particles of the frit are held together by a binder, and air spaces are present between the particles. During the sintering the particles do not lose their identities; that is, they are not completely liquified, and consequently some air is retained within the sintered mass of frit. The cellular formation of the intermediate frit contributes to the physical shock resistance qualities of the unit, the cells providing a cushioning effect in that many cells may be completely crushed without affecting the hermetic seal and without starting cracks which might travel across the pane of glass. Cracks which start in the intermediate frit normally travel only a short distance until they terminate in one of the dead air spaces or cells.

The cellular structure of the sintered intermediate frit 20 is indicated, on greatly exaggerated scale, by the air bubbles 22 in Fig. 7.

As a specific example of how window units 10 are made in accordance with the present invention, the pre-formed metallic frame member 13 is pre-oxidized in a slightly oxidizing atmosphere of 10 percent hydrogen and 90 percent nitrogen having a dew point of approximately $-30°$ C. The frame member 13 is preferably made of a nickel-iron alloy containing 48 to 51 percent nickel and the remainder substantially iron. During the step of pre-oxidizing the frame a tightly adherent grey oxide is formed thereon. The frame member 13 has a temperature coefficient of expansion (between 25 degrees and 300 degrees C.) of approximately 85 to $96 \times 10^{-7}$ in./in./degree C. The frame 13 is sprayed with a frit suspension 19, in which the frit has a theoretical composition of about 70 percent lead oxide (PbO), about 15 percent boric oxide ($B_2O_3$), and about 15 percent silica ($SiO_2$) and an expansivity (25 degrees–300 degrees C.) of approximately $75-76 \times 10^{-7}$ in./in./degrees C., and then fired in a slightly oxidizing controlled atmosphere to pre-glaze the frame. The frit is suspended in a solution comprising distilled water, methyl alcohol and ammonium hydroxide.

In preparing the glass sheet elements 11, 12 for the sealing operation the square corners of the elements 11, 12 are ground and rounded off to fit the frame member 13, which also is formed with rounded corners, to eliminate the building up of undue stress concentrations which would otherwise result.

Additional frit in the form of putty is then applied to the pre-glazed frame member 13 in the areas between the wings 17, 18 and lands 15, 16. The frit putty 20 may have the same composition as the frit 19 previously described plus a suitable binder such as isobutyl methacrylate polymer, or it may be any low melting point frit material which has the desirable physical properties. The unit 10 is then assembled and sealed. The glass elements 11, 12 utilized have a temperature coefficient of expansion (25 degrees–300 degrees C.) of approximately $82$–$84 \times 10^{-7}$ in./in./ degree C. During the sealing the assembly is equalized at approximately 515 degrees C. or near the strain point of the glass panes and then the temperature is raised by radio frequency power or flame heating until the frame wings 17, 18 have reached a temperature of approximately 750 degrees C. The heating causes the frame 13 to expand away from the glass edge 21 and the frit putty 20 to sinter and wet the pre-glazed surface of the sealing lands 15, 16 and the contacting surface of the glass elements 11, 12. After the frit putty 20 is melted sufficiently, the frame 13 is allowed to cool and contract, squeezing the intermediate frit 20 until it fills the interstices between the frame wings 17, 18 and peripheral glass surfaces such as edges 21 and the surfaces adjacent thereto. These glass surfaces 21 are heated sufficiently by radiation and conduction so that good wetting thereof by the frit putty 20 occurs. The sealed unit 10 is then equalized at approximately 540 degrees C. to release strains in the glass elements caused by rapid cooling from the sealing temperature. Inasmuch as the metallic frame member 13 and the glass elements 11, 12 are separated by the frit 20 while it is still fluid, no further stress is applied to the glass elements 11, 12 until the frit putty 20 begins to solidify. The setting point of the frit putty 20 varies with the rate at which it is cooled and the conditions under which the cooling is effected. However, a setting temperature of approximately 375 degrees–425 degrees C., dependent on frit composition and rate of cooling, has proven satisfactory. Finally the unit 10 is cooled to room temperature in such manner that the glass elements 11, 12 are maintained in compression as controlled by the individual properties of its other components.

The term "equalizing" refers to the bringing of the parts of the assembly, that is, frame, frit, and glass pane or panes to the same temperature in the region of the seal. In the case of larger panes of glass or of special applications, the entire pane of glass may or may not be brought to the equalizing temperature, depending on what stresses, especially radial stress, are desired.

The metallic frame member 13 is formed with an aperture (not shown) through the web 14 which permits flushing the sealed unit and filling with the desired atmosphere, after which the aperture is sealed with solder.

Window construction units made in accordance with the present invention have been found to be extremely rugged. The frame member 13 so protects the glass elements 11, 12 and the compression seal renders the same so strong that such units are capable of withstanding considerable thermal and physical shock without failure. For example, units impacted by dropping from a height of 6 feet onto hard wood showed no signs of failure while substantially greater impact merely resulted in chipping of the edges, without affecting the soundness of the seal.

Other specific materials than those described hereinabove may be utilized in carrying out the present invention, but it has been determined that the maximum stress in window glass which is commercially available at present should not exceed 1.0 kg. mm.$^2$ compression. From units in which the expansion of the frame member ranged between 85 and $100 \times 10^{-7}$ in./in./ degree C., that of the window glasses ranged from between 82 and $94 \times 10^{-7}$ in./in./degree C., and that of the intermediate frits ranged from between 75 and $84 \times 10^{-7}$ in./in./degree C. (all expansivities between 25 degrees–300 degrees C.) the materials which gave uniformly successful results are those whose temperature coefficients of expansion bear the following certain relation. The frit should have a coefficient of expansion from 25 degrees C. to its setting point of substantially $3$–$4 \times 10^{-7}$ in./in./ degree C. higher than that of the window glass over the same temperature range; the window glass having a higher setting point as pointed out hereinabove. The coefficient of expansion of the frame member should be from $6$–$12 \times 10^{-7}$ in./in./ degree C. higher than that of the window glass. Though any commercially available materials may be used, it is to be understood that those used have the desired properties and may be successfully sealed in accordance with good sealing practices.

Figs. 8 and 9 illustrate the manner in which a face plate, may be sealed to the cone of the kinescope in accordance with the present invention. The kinescope 30, as illustrated in Fig. 8, comprises, in addition to an electron gun, not shown, a glass neck portion 23 which is sealed to a metallic cone portion 24 which has a flanged lip portion 25 to which the face plate 26 is sealed. Prior to sealing, the face plate 26 may be provided with a fluorescent screen 29, if desired. The flanged sealing portion 25, illustrated in Fig. 9 on an enlarged scale, is first pre-glazed in the same manner as previously described in connection with the multiple pane window units. The flanged sealing lip surfaces 27, 28 correspond to one land and wing portion respectively of the window unit frame member 13. Following the pre-glazing of the flanged sealing portion of the cone, additional frit putty 20 is applied to the sealing surface, the face plate 26 then being set in place and the unit sealed in a manner similar to that of the window units.

This method of sealing a face plate to a kinescope or other electron tube permits the seal to be made at a much lower temperature than if a direct glass-to-metal seal were made. This feature makes feasible the sealing of face plates or other glass members upon which phosphor screen, pigment, or sensitized surfaces have been applied. Also, low temperature sealing avoids excessive oxidation of adjoining parts, which is important in many electron tube applications. Further, because of the low temperature at which seals are made in accordance with the present invention, the glass need not be raised to a temperature high enough to permit sagging or other distortions which would occur if the glass were soft enough to yield or bend under pressure. This feature is especially advantageous where the sealed member is a part of an optical system.

What is claimed is:

1. The method of making an hermetic seal between a glass plate and a continuous metal frame, said frame having a sealing land portion contiguous with a marginal surface portion of said glass plate and a wing sealing portion contiguous with the peripheral end surface of said glass plate, said method comprising applying a glaze coating to said land and wing sealing portions, applying a thermally liquifiable frit putty to said glazed land and wing portions, bringing said glass plate and frame together with the sealing land and wing of said frame in juxtaposition with the marginal surface portion and peripheral end surface of said glass plate respectively and with said frit putty therebetween, heating said glass plate and frame to a temperature near the strain point of said glass plate, further heating said frame to expand the same away from said glass plate and to sinter said frit putty and bond said juxtaposed land, wing, and glass surfaces, reducing the temperature of said frame and glass plate to compress and solidify said frit, and then cooling said frame and glass plate to the ambient temperature.

2. The method of making an hermetic seal between the peripheral end surface and a marginal surface portion of a glass plate and a continuous metal frame member having two intersecting sealing surfaces, said method comprising the steps of cleaning and oxidizing said sealing surfaces, applying a thin coating of thermally liquifiable frit to said cleaned and oxidized sealing surfaces, raising the temperature of said frame member to liquify said frit and pre-glaze said sealing surfaces, applying thermally liquifiable frit putty to said pre-glazed sealing surfaces, bringing the peripheral end surface and the marginal surface portion of said glass plate in juxtaposition with respect to said pre-glazed sealing surfaces, raising said glass plate and said frame member to a temperature near the strain point of said glass plate, further raising the temperature of said frame member to expand said frame member away from said glass plate and at least partially to liquify said frit putty so that said frit putty bonds to said glass plate and to said pre-glazed sealing surfaces, reducing the temperature of said glass plate and frame member to release glass strains and shrink said frame member towards the periphery of said glass plate and squeeze the frit putty which is positioned therebetween to fill any interstices between said periphery and said sealing surfaces, further reducing the temperature of said glass plate and frame member until said frit putty solidifies, and then cooling said glass plate and said frame member to the ambient temperature.

3. In the art of sealing a multiple glazed window unit of the kind comprising a pair of parallel glass plates supported in spaced-apart relation by an intervening metal frame of generally U-shape cross-section, said frame having land portions contiguous with the inner marginal surface portions of said plates and having wing portions contiguous with the peripheral end surfaces of said plates, said land and wing portions having a glazed coating thereon, said frame having a slightly higher temperature coefficient of expansion with respect to said glass plates, the method which comprises the steps of applying thermally liquifiable frit putty to said glazed land and wing portions, bringing said inner marginal surface portions and said peripheral end surfaces of said glass plates in juxtaposition respectively with said frame land and wing portions with said frit putty therebetween, to form a unit, raising the temperature of said unit to approximately 515 degrees centigrade, which is near the strain point of said glass plates, raising the temperature of said frame member at least to the melting point of said frit putty and to approximately 750 degrees centigrade to expand said frame away from said plates, sinter said frit putty and cause said frit putty to wet and bond to said glazed frame portions and said plates, then after cooling said frame and glass plates to about 540 degrees centigrade to contract said frame about said plates and cause said frit putty to fill any interstices between said plates and said frame, further reducing the temperature until said frit putty solidifies, then cooling said unit to the ambient temperature.

4. In the art of sealing a multiple glazed window unit of the kind comprising a pair of parallel glass plates supported in spaced-apart relation by an intervening metal frame of generally U-shape cross-section, said frame having land portions contiguous with the inner marginal surface portions of said plates and having wing portions contiguous with the peripheral end surfaces of said plates, said land and wing portions having a glazed coating thereon, the method which comprises; applying thermally liquifiable frit putty to said glazed land and wing portions, bringing said inner marginal surface portions and said peripheral end surfaces of said glass plates in juxtaposition respectively with said frame land and wing portions with said frit putty therebetween, to form a unit, raising the temperature of said unit to a temperature near the strain point of said glass plates, further raising the temperature of said frame to expand said wing portions away from said peripheral end surfaces and at least partially to liquify said frit putty, said last mentioned temperature being high enough to cause said liquified frit putty to wet and bond to said glazed frame portions and said glass plates, reducing the temperature of said unit to release strains and to cause said frame to contract and squeeze said frit putty to fill any interstices between said glass plates and said frame land and wing portions, further reducing the temperature of said unit to solidify said frit putty while said frame continues to contract and to put said peripheral end surfaces in compression, and cooling said unit to the ambient temperature.

5. In the art of sealing a multiple glazed unit which comprises a pair of parallel glass plates supported in spaced-apart relation by an intervening metal frame, said frame having pre-glazed land and wing portions, said land portions being contiguous with the inner marginal surface portions of said plates, said wing portions being contiguous with the peripheral end surfaces of said plates, the method which comprises applying a frit putty to said pre-glazed land and wing portions, said frit putty having a softening point lower than that of said glass plates, bringing the inner marginal surface portions and the peripheral end surfaces of said glass plates in juxtaposition respectively with said pre-glazed land and wing portions with said frit putty therebetween to form a unit, raising the temperature of said unit near the strain point of said glass plates, further raising the temperature of said frame to the fusion point of said frit putty but below the softening point of said glass plates to expand said frame wing portions away from said glass plates and to cause said frit putty to sinter and to wet said frame land and wing portions and said glass plates, reducing the temperature of said frame to shrink said frame and squeeze said frit putty to fill the interstices between said land and wing portions and said glass plates, further reducing the temperature of said unit to cause said frit putty to solidify and bond to said frame and said glass plates while causing said frame to further contract and compress said peripheral end surfaces, and cooling said unit to the ambient temperature.

6. The method according to claim 5 and wherein said metal frame has a slightly higher temperature coefficient of expansion than said glass plates at the setting point of said frit putty.

7. The method according to claim 5 and wherein said frit putty has a temperature coefficient of expansion slightly higher than that of said glass plates at the setting point of said frit putty.

8. The method according to claim 5 and wherein the temperature coefficient of expansion of said metal frame is from 6 to $12 \times 10^{-7}$ inches per inch per degree centigrade higher than that of said glass plates, and the temperature coefficient of expansion of said frit putty is about 3 to $4 \times 10^{-7}$ inches per inch per degree centigrade higher than that of said glass plates at the setting point of said frit putty.

References Cited in the file of this patent

UNITED STATES PATENTS

| | | |
|---|---|---|
| 2,122,453 | Clause | July 5, 1938 |
| 2,137,424 | Thomas | Nov. 22, 1938 |
| 2,151,809 | Shardlow | Mar. 28, 1939 |
| 2,558,878 | Richardson | July 3, 1951 |
| 2,589,064 | Drake | Mar. 11, 1952 |
| 2,625,717 | Wampler et al. | Jan. 20, 1953 |
| 2,629,093 | Pask et al. | Feb. 17, 1953 |

FOREIGN PATENTS

| | | |
|---|---|---|
| 578,580 | Great Britain | July 3, 1946 |